United States Patent
Wang et al.

(10) Patent No.: US 8,031,389 B2
(45) Date of Patent: Oct. 4, 2011

(54) REFLECTION-CONTROLLABLE ELECTROCHROMIC DEVICE USING A BASE METAL AS A TRANSPARENT CONDUCTOR

(75) Inventors: Zhongchun Wang, Santa Rosa, CA (US); Paul P. Nguyen, San Jose, CA (US)

(73) Assignee: Soladigm, Inc., Milpitas, CA (US)

( * ) Notice: Subject to any disclaimer, the term of this patent is extended or adjusted under 35 U.S.C. 154(b) by 229 days.

(21) Appl. No.: 12/242,917

(22) Filed: Oct. 1, 2008

(65) Prior Publication Data
US 2010/0079845 A1   Apr. 1, 2010

(51) Int. Cl.
*G02F 1/153* (2006.01)
(52) U.S. Cl. .......................... 359/265; 359/267
(58) Field of Classification Search ........... 359/265–275
See application file for complete search history.

(56) References Cited

U.S. PATENT DOCUMENTS

| | | | |
|---|---|---|---|
| 6,165,388 A * | 12/2000 | Coleman | 252/520.1 |
| 6,420,071 B1 * | 7/2002 | Lee et al. | 429/300 |
| 6,507,428 B1 * | 1/2003 | Heuer et al. | 359/273 |
| 6,620,342 B1 * | 9/2003 | Burchill et al. | 252/511 |
| 6,647,166 B2 | 11/2003 | Richardson | |
| 6,906,842 B2 * | 6/2005 | Agrawal et al. | 359/265 |
| 6,995,891 B2 * | 2/2006 | Agrawal et al. | 359/265 |
| 7,042,615 B2 | 5/2006 | Richardson | |
| 7,804,635 B1 * | 9/2010 | Wang et al. | 359/273 |
| 2002/0018938 A1 * | 2/2002 | Takeuchi et al. | 429/317 |
| 2007/0058237 A1 * | 3/2007 | Appelfeller et al. | 359/267 |
| 2007/0076288 A1 * | 4/2007 | Yoshimura et al. | 359/267 |
| 2007/0097483 A1 * | 5/2007 | Park | 359/273 |

OTHER PUBLICATIONS

M. Hashimoto et al., "Effect of the Predeposition of Gold, Silver, Tin or Lead on the Growth and Crystallization Processes of Amorphous Antimony Layers," Thin Solid Films, 197.
M. Hashimoto et al., "Nucleation and Growth of Crystallites in Amorphous Antimony Layers on As-Deposited Ultrathin Sublayers of Metal: Copper, Silver, Gold, Tin and Lead," Thin Solid Films, 188 (1990), 95-108.
J.N. Huiberts et al., "Yttrium and lanthanum hydride film with switchable optical properties," Nature, 380, 1996, pp. 231-234.
K.S. Novoselov et al., "Electric Field Effect in Atomically Thin Carbon Films," Science 306, (2004), pp. 666-669.
Z. Wu et al., "Transparent, Conductive Carbon Nanotube Films," Science, vol. 305, Aug. 27, 2004, pp. 1274-1276.

* cited by examiner

*Primary Examiner* — Ricky Mack
*Assistant Examiner* — Tuyen Tra
(74) *Attorney, Agent, or Firm* — Joseph P. Curtin, L.L.C.

(57) ABSTRACT

An all-solid-state electrochromic device comprises a transparent base material, and an electrochromic multilayer-stack structure formed on the transparent base material. The electrochromic multilayer-stack structure comprises a first transparent-conductive film formed on the transparent base material, an ion-storage layer formed on the first transparent-conductive film, a solid-electrolyte layer formed on the ion-storage layer, and an electrochromic layer formed on the solid-electrolyte layer. The electrochromic layer comprises a reflection-controllable electrochromic layer. In one exemplary embodiment, the electrochromic layer comprises a reflection-controllable layer that comprises at least one of antimony and an antimony-based alloy. A second transparent-conductive film can be formed on the reflection-controllable layer, or between the reflection-controllable layer and the solid-electrolyte layer. In one exemplary embodiment, the second transparent-conductive layer comprises a base metal and/or a base metal alloy.

14 Claims, 6 Drawing Sheets

REFLECTION-CONTROLLABLE ELECTROCHROMIC DEVICE USING A BASE METAL AS A TRANSPARENT CONDUCTOR

CROSS-REFERENCE TO RELATED APPLICATION

The present patent application is related to U.S. patent application Ser. No. 12/242,897, entitled "Durable Reflection-Controllable Electrochromic Thin Film Material," filed Sep. 30, 2008, invented by Zhongchun Wang et al., the disclosure of which is incorporated by reference herein.

BACKGROUND

The subject matter disclosed herein relates to an all-solid-state reflection-controllable electrochromic device. More particularly, the subject matter disclosed herein relates to an all-solid-state reflection-controllable electrochromic device that has high transmittance in the bleached state and is capable of switching in a short period of time over a large surface area between a transparent state and a reflective state.

Windows and other openings are generally the place where the most heat enters and escapes buildings. For example, during the winter about 48% of the heat produced by a heating system of a building escapes through windows of the building. During the summer, the proportion of heat that enters an air-conditioned room through the windows can reach about 71%. A tremendous energy savings can, therefore, be realized by effectively controlling light and heat entering and escaping through windows. Light-control glass has been developed to control the bi-directional flow of light and heat through a window.

There are several ways that light is controlled by light-control glass. One way is to form an electrochromic material on the glass in which the transmissivity of the electrochromic material reversibly changes under application of a current or a voltage. Another way is to form a thermochromic material on the glass in which the transmissivity of the thermochromic material changes with temperature. Yet another way is to use a gastrochromic material that changes its transmissivity by controlling the atmosphere gas. Of these, electrochromic-based light-control glass has been researched in which a tungsten-oxide thin film is used for the light-control layer. Some commercial products based on this type of electrochromic light-control glass have already appeared.

Conventional electrochromic-based light-control glass, including tungsten-oxide-based versions, all control light by absorbing the light using a light-control layer. A significant drawback with absorbing the light is that heat is produced and radiated into a room when the light-control layer absorbs light, thereby diminishing the energy-saving effect of the conventional electrochromic light-control glass. To eliminate this drawback, another approach of reflecting light rather than absorbing light has been considered. Accordingly, a material capable of reversibly switching between a mirror state and a transparent state would be useful.

For a long time, such a material capable of switching between a mirror state and a transparent state was not found, but in 1996 a group in the Netherlands discovered a hydride of a rare earth, such as yttrium or lanthanum, switches between a mirror state and a transparent state under the influence of hydrogen. Such a material is conventionally referred to as a "switchable mirror". See, for example, J. N. Huiberts et al., Nature, 380, 1996, 231. The rare-earth hydrides undergo a large change in transmissivity, and have excellent light-control mirror characteristics. Nevertheless, because a rare-earth element is used in the material, there are problems in terms of resources and cost when rare-earth-hydride-based switchable mirrors are used for window coatings and other applications.

Additionally, conventional metal-hydride-based mirrors suffer from poor cycle life due to the reactive nature of the metal film, which is readily attacked by air or water. Notably, water is one component of the electrolyte in electrochromic hydride mirrors, and may be produced during removal of hydrogen from the mirror film in both electrochromic and gasochromic devices. The life-cycle degradation is conventionally inhibited by using additional barrier layers for protecting the active materials and by sealing devices for preventing access of environmental air and water. The former approach of adding barrier layers is difficult to achieve and may not be effective after long periods of use. The latter approach of sealing does not address the problem of internal sources of water or oxygen.

More recently, U.S. Pat. No. 6,647,166 B2 to T. J. Richardson discloses alloys of magnesium and transitional-metals that can be used as switchable-mirror materials, thereby significantly reducing the cost of materials for electrochromic-based light-control glass.

Additionally, the commonly used transparent conducting oxide (TCO) coatings, such as indium tin oxide (ITO), fluorine-doped tin oxide (FTO), and aluminum-doped zinc oxide, are unstable at the switching voltages used for the reflection-controllable electrochromic devices. Side reactions, such as irreversible lithium intercalation, occur at the extremely low voltages, resulting in fast degradations of the TCO layers. Therefore, mirror electrodes for reflective-type electrochromic device prepared to date have relied upon the intrinsic conductivity of the active material. Volume expansion and contraction during cycling contribute to loss of connectivity within the electrode and eventually produce isolated regions that switch slowly or not at all.

U.S. Pat. No. 7,042,615 B2 to T. J. Richardson discloses use of a semi-metal, antimony, as a switchable-mirror thin-film material that is based on lithium insertion and extraction. Addition of low-resistivity metals, such as Ag and Cu, to the thin-film material is also disclosed by Richardson for improving the cycling stability of the mirrors. The added low-resistivity metals reduce the volume change and increase the conductivity of the switchable-mirror thin-film materials in all states of charge, thereby improving the uniformity of the current density across the thin film and reducing the stress between regions of different composition. For an antimony film containing 33% copper, the volume change on full lithiation is about 70% as opposed to 136% for pure Sb. The resulting semiconducting phase is diluted by copper and, therefore, less prone to coarsening on delithiation. Nevertheless there exists a serious problem with noble metals, such as Ag and Cu, if used as an additive. For example, when noble metals are added in the active layer of an all-solid-state electrochromic device, the noble metals can easily migrate (referred to herein as "electromigration") into the solid electrolyte layer and create shorts for the device (and, thus, a failed device), particularly when an electric field is applied to the device to switch the state of the device, and the solid electrolyte layer of the device is relatively thin (for example, less than about 100 nm in thickness).

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

As used herein the word "exemplary" means "serving as an example, instance, or illustration." Any embodiment described herein as "exemplary" is not to be construed as necessarily preferred or advantageous over other embodiments. Additionally, as used herein, the term "electromigration" refers to the phenomenon of migration of a noble metal into a solid electrolyte layer under an applied electric field. As used herein, the terms "electrochromic device" and "solid-state electrochromic device" refer to an all-solid-state reflection-controllable electrochromic device according to the subject matter disclosed herein.

The subject matter disclosed herein relates to a reflection-controllable electrochromic device that has high transmittance in the bleached state and is capable of switching large areas of the electrochromic device between a bleached state and a reflective state in a relatively short period of time. According to the subject matter disclosed herein, one exemplary embodiment of an all-solid-state reflection-controllable electrochromic device utilizes a multilayer-stack structure comprising a particular arrangement of layers that allows either a reflection-controllable layer or an absorptive-based (absorption-controllable) electrochromic layer to be used.

One exemplary embodiment of a multilayer-stack structure comprises a highly durable reflection-controllable electrochromic thin-film material comprising alloys of antimony and lithium. One exemplary embodiment of the highly durable reflection-controllable thin film material comprises antimony or antimony-lithium alloy and a base metal or a base-metal alloy. Suitable base metals comprise Co, Mn, Ni, Fe, Zn, Ti, V, Cr, Zr, Nb, Mo, Hf, Ta, W, Cd, Mg, Al, Ga, In, Sn, Pb, Bi, and alloys thereof. One exemplary embodiment of a multilayer-stack structure comprises a thin-film material comprising antimony, a base metal, and lithium, and has survived cycling tests when configured in an all-solid-state reflective device for over one hundred cycles with less than 10% of degradation in the switching ranges of both transmission and reflection. Details regarding suitable highly durable reflection-controllable thin film materials or the active reflection-controllable layer are disclosed in copending and co-assigned U.S. patent application Ser. No. 12/242,897, entitled "Durable Reflection-Controllable Electrochromic Thin Film Material," invented by Zhongchun Wang et al., filed Sep. 30, 2008, and incorporated by reference herein.

When base metals, which are typically much less diffusive than noble metals, are added into the active reflection-controllable layer of a solid-state electrochromic device, the problems associated with electromigration in the solid-state electrochromic device are eliminated. That is, an active reflection-controllable layer according to the subject matter disclosed herein does not exhibit electromigration when used in a solid-state electrochromic device, and the reflection-controllable layer becomes transparent upon lithiation and reflective upon delithiation.

Moreover, base metals are stable at the low switching voltage of a switchable mirror device. Because the base metal thin films that are used for the reflective-controllable layers that are disclosed herein are inherently far more electrically conductive than TCOs, the metal thin films can be a factor of 10 to 50 times thinner than a typical TCO and still performs satisfactorily in reflective-controllable electrochromic devices. Additionally, the deposition rate for metal thin films applied to surfaces by a conventional DC-magnetron sputtering process can be a factor of 10 faster than the deposition rate for TCOs applied to the same surfaces.

An electrochromic device according to the subject matter disclosed herein is applied to a light-controllable member, such as an architectural construction member, vehicle part, aircraft part, watercraft part, or spacecraft part on the basis of the function thereof. In the case of an architectural construction member, window glass is a typical applicable member thereof. In the case of a vehicle part, aircraft part or a watercraft part, examples of applicable parts include, but are not limited to, window glass, sun roofs, exterior paneling and interior parts, and portal glass. Use of a reflection-controllable electrochromic device according to the subject matter disclosed herein makes it possible to control the amount of transmitted radiant energy, and maintain a comfortable interior space.

A solid-state electrochromic device according to the subject matter disclosed herein generally comprises a multilayer-stack structure formed on a transparent base material. The multilayer-stack structure generally comprises at least a transparent conductive film, an ion storage layer, a solid electrolyte layer, and a reflection-controllable layer formed from an antimony-based alloy thin film. The thin films forming the layers of exemplary multilayer-stack structure are produced in a well-known manner by, for example, a magnetron-sputtering technique, a vacuum-deposition technique, an electron-beam deposition technique, a chemical-vapor-deposition (CVD) technique, a plating technique, a sol-gel technique and the like. It should be understood, though, that the particular technique that could be used for forming the respective thin films is not limited to the exemplary techniques set forth herein.

Figure 1:
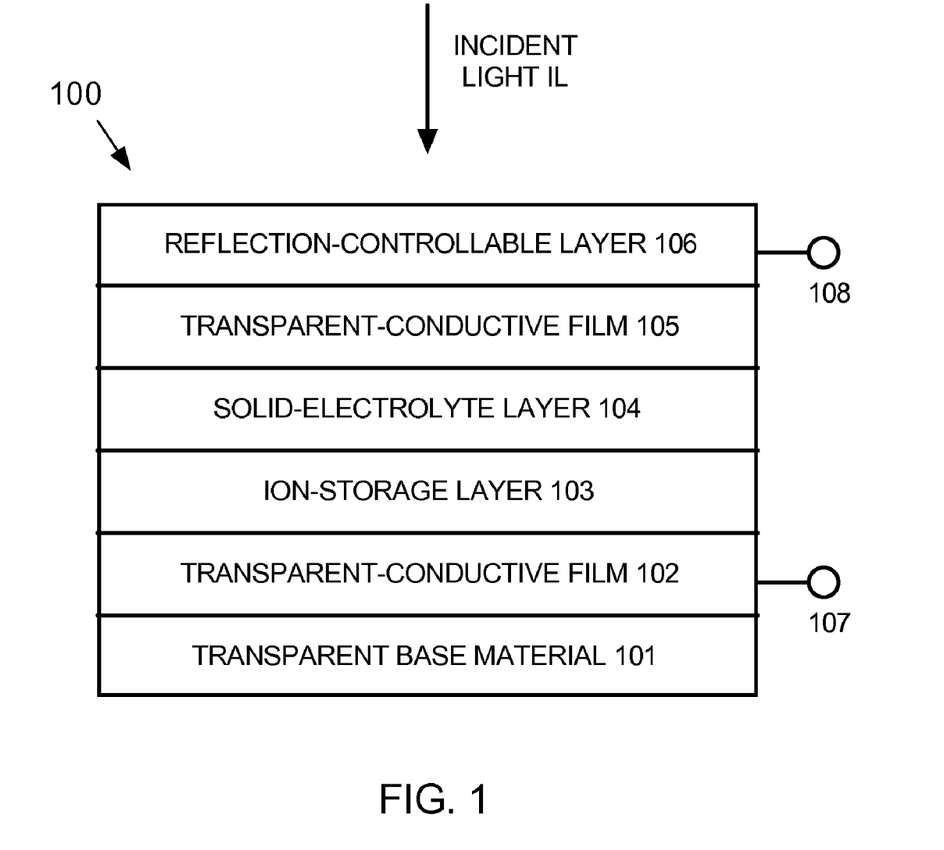
FIG. 1 depicts a cross-sectional schematic view of one exemplary embodiment of a multilayer-stack structure of an electrochromic device according to the subject matter disclosed herein.

FIG. 1 depicts a cross-sectional schematic view of one exemplary embodiment of a multilayer-stack structure 100 of an electrochromic device according to the subject matter disclosed herein. Multilayer-stack structure 100 comprises a transparent base material 101 (also referred to herein as a "base material"), a transparent-conductive film 102, an ion-storage layer 103, a solid-electrolyte layer 104, a transparent-conductive layer 105, and a reflection-controllable layer 106. Reflection-controllable layer 106 (also referred to herein as a "mirror layer") comprises an antimony-based alloy thin film. It should be understood that FIG. 1 is merely a depiction and does not accurately convey the relative and/or absolute sizes and thickness of the depicted layers. Additionally, electrical connections to the electrochromic device are made in a well-known manner to transparent-conductive film 102 and reflection-controllable layer 106, as respectively depicted by electrical connections 107 and 108.

Base material 101 not only functions as a foundation for forming the multilayer-stack structure, but also functions as a barrier for controlling the intrusion of water and oxygen into the multilayer-stack structure. It should be understood that there are no particular limitations on the materials and shapes of the base material provided it functions as a base material of an electrochromic device.

Transparent-conductive film 102 comprises an electrically conductive material through which a voltage or a current is applied for controlling the reflectance of the electrochromic device. There are no particular limitations on the material that can be used for transparent-conductive film 102. Examples of suitable materials that could be used for transparent-conductive film 102 comprise metal thin films, such as gold, silver, copper, aluminum, nickel, tungsten, platinum, palladium, tin, titanium, zinc and alloys thereof, and oxides, such as indium tin oxide, fluorine tin oxide, antimony tin oxide, tin oxide and zinc oxide. Alternatively, organic-polymer materials could also be used for transparent-conductive film 102.

The sheet resistance of transparent-conductive film 102 is important to the switching speed of the electrochromic device, and the value of the sheet resistance should be accordingly low. More specifically, the sheet resistance of transparent-conductive film 102 should comprise about 100 Ohm/□ or less. Additionally, transparent-conductive film 102 comprises a high visible-light transmittance when the electrochromic device is used in an application with window glass. That is, the visible-light transmission of transparent-conductive film 102 should comprise 70% or more. Transparent-conductive film 102 can be formed by coating it over the entire surface of the base material and the surface of the reflection-controllable layer, and/or could be patterned on one or both. An advantage of using a patterned electrode is that the spectra transmission of the device can be increased at the portions of the device having no electrode.

Ion-storage layer 103 is capable of reversibly storing and removing lithium ions required for switching reflection-controllable layer 106 between a transparent state and a mirrored state. In one exemplary embodiment, ion-storage layer 103 comprises a material that is colorless and transparent, such as a transition metal oxide. Suitable exemplary transition metal oxides comprise tungsten oxide, molybdenum oxide, niobium oxide and vanadium oxide. Tungsten oxide, in particular, comprises a high stability ($10^6$ cycles or more) for use in an electrochromic device. It should be understood, however, that the particular material of the transition metal oxide is not limited to the exemplary materials listed and that other materials could be used provided that the materials have similar characteristics as the suitable transition metal oxides. Although there are no particular limitations on the thickness of ion-storage layer 103, in one exemplary embodiment, the thickness is between about 200 nm to about 2000 nm. In an alternative exemplary embodiment, an additional sublayer of a base metal could be added between the transparent-conductive layer and the ion-storage layer to further increase the sheet conductance associated with a transparent-conductive layer.

Solid-electrolyte layer 104 comprises a material that allows lithium ions to move easily in response to an applied voltage or current. In one exemplary embodiment, solid-electrolyte layer 104 comprises a transparent conductive oxide. Specific examples of constituent components of solid-electrolyte layer 104 comprise silicon oxide ($SiO_2$), aluminum oxide ($Al_2O_3$), lithium oxide ($Li_2O$), gallium oxide ($Ga_2O_3$), phosphorus oxide ($P_2O_5$), silicon aluminum oxide, lithium silicate, lithium aluminate, lithium aluminosilicate, and solid solution thereof It should be understood, however, that the material forming solid-electrolyte layer 104 is not limited to the exemplary materials listed and that other materials could be used provided that the materials have similar characteristics as the suitable transparent conductive oxides. Because electrolyte layer 104 is a solid, electrolyte layer 104 is stable for long periods of time. Additionally, solid-electrolyte layer 104 should be anhydrous because the presence of moisture can cause oxidation deterioration of the reflection-controllable layer, which contains antimony and lithium. Although there are no particular limitations on the thickness of solid-electrolyte layer 104, in one exemplary embodiment, the thickness is between about 25 nm to about 1000 nm. It should also be understood that the solid-electrolyte layer of the exemplary multilayer-stack structures could be formed from two or more solid-electrolyte layers.

Transparent-conductive film 105 comprises an electrically conductive material. Combined with reflection-controllable layer 106, transparent-conductive film 105 ensures that the total electrical resistance of the mirror electrode is sufficiently low at all states of charge. For example, base metals are suitable materials for forming transparent-conductive film 105. Materials formed using the noble metals have the problem of electromigration when used in a solid-state electrochromic device. However, if the solid electrolyte layer is made sufficiently thick ($\geq$ about 1 μm) and dense ($\geq$ about 90% of its crystalline density) (disadvantage: thicker and denser electrolyte layer will have lower ion conductivity, resulting in a slower-switching device), the electromigration of noble metals can be inhibited and therefore noble metals can still be used. As long as transparent-conductive film 105 is stable at the switching voltages of the electrochromic device and does not exhibit electromigration, there are no other particular limitations on the material that can be used for transparent-conductive film 105. Alternatively, organic polymer materials could also be used for transparent-conductive film 105. Transparent-conductive film 105 is typically formed to be thin, i.e., between about 0.1 nm and about 50 nm, in order to obtain a relatively higher transmittance.

Further, newly developed materials, such as carbon nanotube films and graphene films, could be used for transparent-conductive film 105. Recently, carbon nanotube films, such as disclosed by Z. Wu et al., *Science* 2004, 305, 1273, and graphene films, such as disclosed by K. S. Novoselov et al., *Science* 2004, 306, 666, have been investigated as transparent, conductive electrodes. Due to their superior electrochemical stability, these carbon-based transparent conductors should be suitable for use in the electrochromic switchable mirror devices. The production of carbon nanotube or graphene thin films at the industrial scale, however, has not been realized yet and may not become a reality within years. Moreover, currently these carbon-based transparent conductors have a high sheet resistance that may limit reflection-controllable electrochromic device performance.

Reflection-controllable layer 106 comprises a material that is capable of being controlled between a transparent state and a mirror state in response to lithium insertion or extraction. Suitable materials for reflection-controllable layer 106 are disclosed in copending and co-assigned U.S. patent application Ser. No. 12/242,897, entitled "Durable Reflection-Controllable Electrochromic Thin Film Material," invented by Zhongchun Wang et al., filed concurrently herewith, now U.S. Pat. No. 7,646,526 B1 to Wang et al., and incorporated by reference herein.

In one exemplary embodiment, reflection-controllable layer 106 comprises antimony or an antimony-base metal alloy. Exemplary base metals comprise Co, Mn, Ni, Fe, Zn, Ti, V, Cr, Zr, Nb, Mo, Hf, Ta, W, Cd, Mg, Al, Ga, In, Sn, Pb, Bi, and alloys thereof In another exemplary embodiment, reflection-controllable layer 106 comprises other semi-metals, such as Bi, Te, and Se, and alloys of Bi, Te and Se. In yet another exemplary embodiment, reflection-controllable layer 106 comprises an antimony-cobalt or antimony-manganese alloy in which the ratio between cobalt/manganese and antimony is within the range of 0.1 to 0.5. An antimony-cobalt or antimony-manganese alloy in which this range is from 0.1 to 0.3, in particular, tends to exhibit higher transmissivity when it becomes transparent as a result of lithiation. In an alternative embodiment, layer 106 could be formed from absorptive-based (absorption-controllable) electrochromic materials. In such an embodiment, the multilayer-stack structure would operate as an absorption-controllable electrochromic multilayer-stack structure.

Although a certain degree of impurities are permitted to be contained because the antimony-based alloy is an alloy, the amount of impurities contained should be accordingly low. The thickness of the reflection-controllable layer 106 is between about 20 nm to about 200 nm. If the reflection-controllable layer is excessively thin, the light reflectivity in the mirrored state decreases, and adequate reflection characteristics are not exhibited. Conversely, if the reflection-controllable layer is excessively thick, light transmissivity in the transparent state decreases. Thus, selection of a particular thickness of reflection-controllable layer 106 is based on the particular requirements of the application.

Operation of light-control of an all-solid-state reflection-controllable electrochromic device comprising the exemplary embodiment of the multilayer-stack structure depicted in FIG. 1 is performed by applying a voltage between a transparent-conductive film 102 and a reflection-controllable layer 106. Specifically, if a negative voltage is applied to reflection-controllable layer 106 with respect to the voltage applied to ion-storage layer 103 (through transparent-conductive film 102) when the electrochromic device is in a mirror state, lithium ions stored in ion-storage layer 103 diffuse into reflection-controllable layer 106 through solid-electrolyte layer 104, thereby causing lithiation of reflection-controllable layer 106 and changing the reflection characteristics thereof from a mirror state to a transparent state. Conversely, when the electrochromic device is in a transparent state, if a positive voltage is applied to reflection-controllable layer 106 with respect to the voltage applied to ion-storage layer 103 (through transparent-conductive film 102), lithium antimonide within reflection-controllable layer 106 are delithiated, and the reflection characteristics thereof return to a mirrored state from the transparent state. The released lithium ions return to ion-storage layer 103 by passing through solid-electrolyte layer 104, and are stored in ion-storage layer 103. It should be understood that operation of the electrochromic device is similar with currents, as opposed to voltages, are applied.

The exemplary embodiment of the multilayer-stack structure 100 depicted in FIG. 1 represents an exemplary arrangement in which the transparent conductive film 105 (non-active for optical switching) is formed before the reflection-controllable layer 106 (active for optical switching) is formed. There are at least three advantages to this exemplary arrangement. First, because incident light IL strikes the reflection-controllable layer 106 first, the reflectance modulation range of the device is not significantly affected by the transparent-conductive film layer 105. Second, the transparent-conductive layer 105 serves as nucleation and crystallization seeds for the reflection-controllable layer 106 during its deposition, thereby providing the as-deposited reflection-controllable layer 106 with enhanced reflectance. See, for example, M. Hashimoto et al., Thin Solid Films, 188 (1990) 95-108 and 199 (1991) 71-83. Third, for this exemplary configuration, the transparent-conductive layer 105 can be formed to be ultrathin (on the order of about 5 nm), discontinuous, and/or can be composited with non-absorbing oxides and/or nitrides to further enhance the maximum transmissivity of the electrochromic device, while still providing sufficiently high electrical conductivity for the reflection-controllable layer 106.

Because a reflection-controllable layer is susceptible to deterioration if exposed to air and/or moisture, the order in which the active reflection-controllable layer and the non-active transparent conductive layer are formed can be selected for reducing penetration of water and/or oxygen into the active reflection-controllable layer. For example, in one exemplary embodiment, the active reflection-controllable layer is deposited before the non-active transparent-conductive layer. Alternatively, a transparent protection layer or a transparent base layer could be formed on the active reflection-controllable layer for reducing penetration of water and/ or oxygen into the active reflection-controllable layer.

Figure 2:
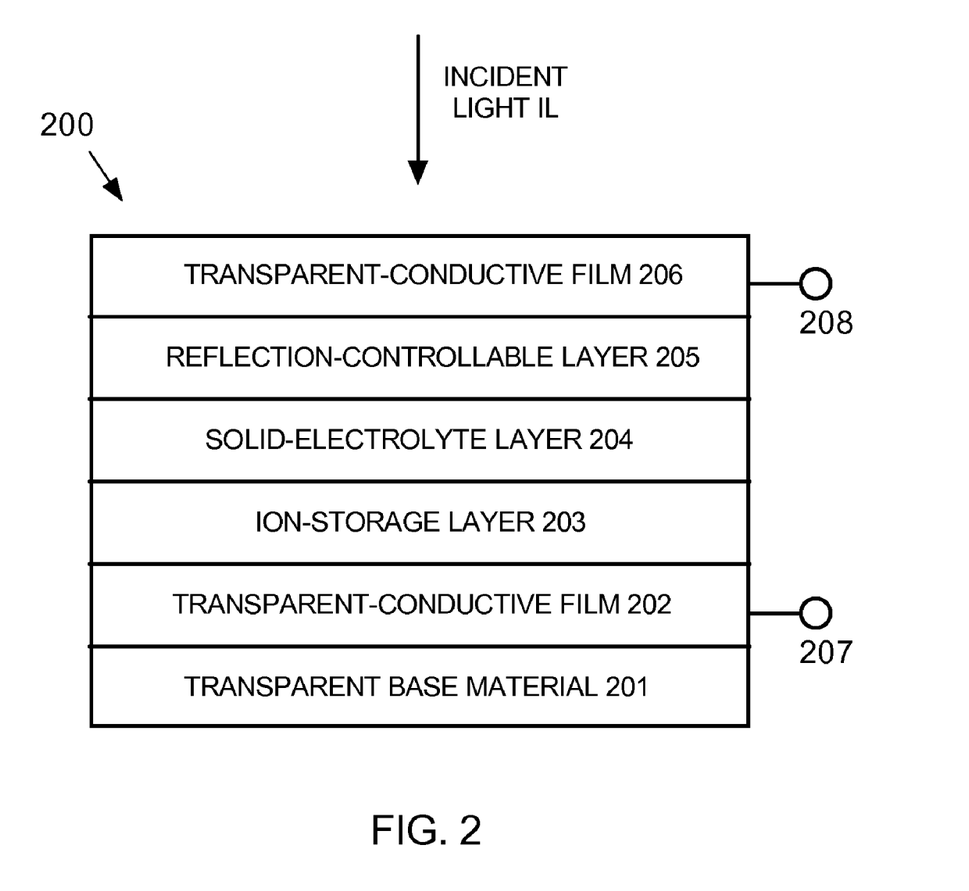
FIG. 2 depicts a cross-sectional schematic view of alternative exemplary embodiment of a multilayer-stack structure of an electrochromic device according to the subject matter disclosed herein.

FIG. 2 depicts a cross-sectional schematic view of alternative exemplary embodiment of a multilayer-stack structure 200 of an electrochromic device according to the subject matter disclosed herein. The alternative exemplary embodiment of multilayer-stack structure 200 differs from the exemplary embodiment of multilayer-stack structure 100 by an active reflection-controllable layer being formed prior to a non-active transparent-conductive layer. In particular, multilayer-stack structure 200 comprises a transparent base material 201, a transparent-conductive film 202, an ion-storage layer 203, a solid-electrolyte layer 204, a reflection-controllable layer 205 and a transparent-conductive film 206. Reflection-controllable layer 205 comprises an antimony-based alloy thin film. It should be understood that FIG. 2 is merely a depiction and does not accurately convey the relative and/or absolute sizes and thickness of the depicted layers. Additionally, electrical connections to the electrochromic device are made in a well-known manner to transparent-conductive film 202 and reflection-controllable layer 206, as respectively depicted by electrical connections 207 and 208. In an alternative embodiment, layer 205 could be formed from absorptive-based (absorption-controllable) electrochromic materials. In such an embodiment, the multilayer-stack structure would operate as an absorption-controllable electrochromic multilayer-stack structure.

Figure 3:
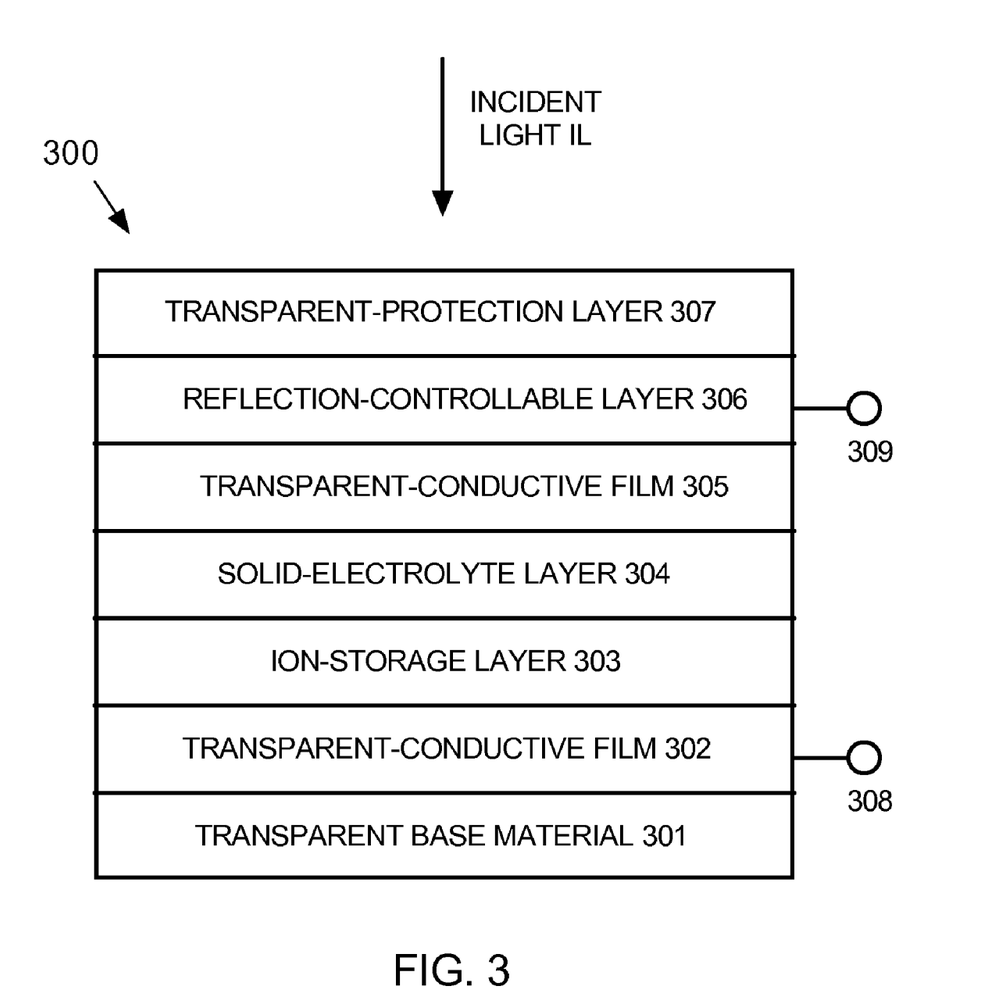
FIG. 3 depicts a cross-sectional schematic view of another alternative exemplary embodiment of a multilayer-stack structure of an electrochromic device according to the subject matter disclosed herein.

FIG. 3 depicts a cross-sectional schematic view of another alternative exemplary embodiment of a multilayer-stack structure 300 of an electrochromic device according to the subject matter disclosed herein. The exemplary embodiment of multilayer-stack structure 300 is similar to the exemplary embodiment of multilayer-stack structure 100, but further comprises a transparent protection layer that is formed on the active reflection-controllable layer. In particular, multilayer-stack structure 300 comprises a transparent base material 301, a transparent-conductive film 302, an ion-storage layer 303, a solid-electrolyte layer 304, a transparent-conductive film 305, a reflection-controllable layer 306, and a transparent protection layer 307. In one exemplary embodiment, transparent-protection layer 307 comprises a material that is non-permeable to lithium, oxygen, and water. Examples of suitable materials for transparent-protection layer 307 comprise silicon oxide, aluminum oxide, silicon aluminum oxide, zirconium oxide, silicon carbide, and silicon oxycarbide. It should be understood that FIG. 3 is merely a depiction and does not accurately convey the relative and/or absolute sizes and thickness of the depicted layers. Additionally, electrical connections to the electrochromic device are made in a well-known manner to transparent-conductive film 302 and reflection-controllable layer 306, as respectively depicted by electrical connections 308 and 309. In an alternative embodiment, layer 306 could be formed from absorptive-based electrochromic materials. In such an embodiment, the multilayer-stack structure would operate as an absorption-controllable electrochromic multilayer-stack structure.

Figure 4:
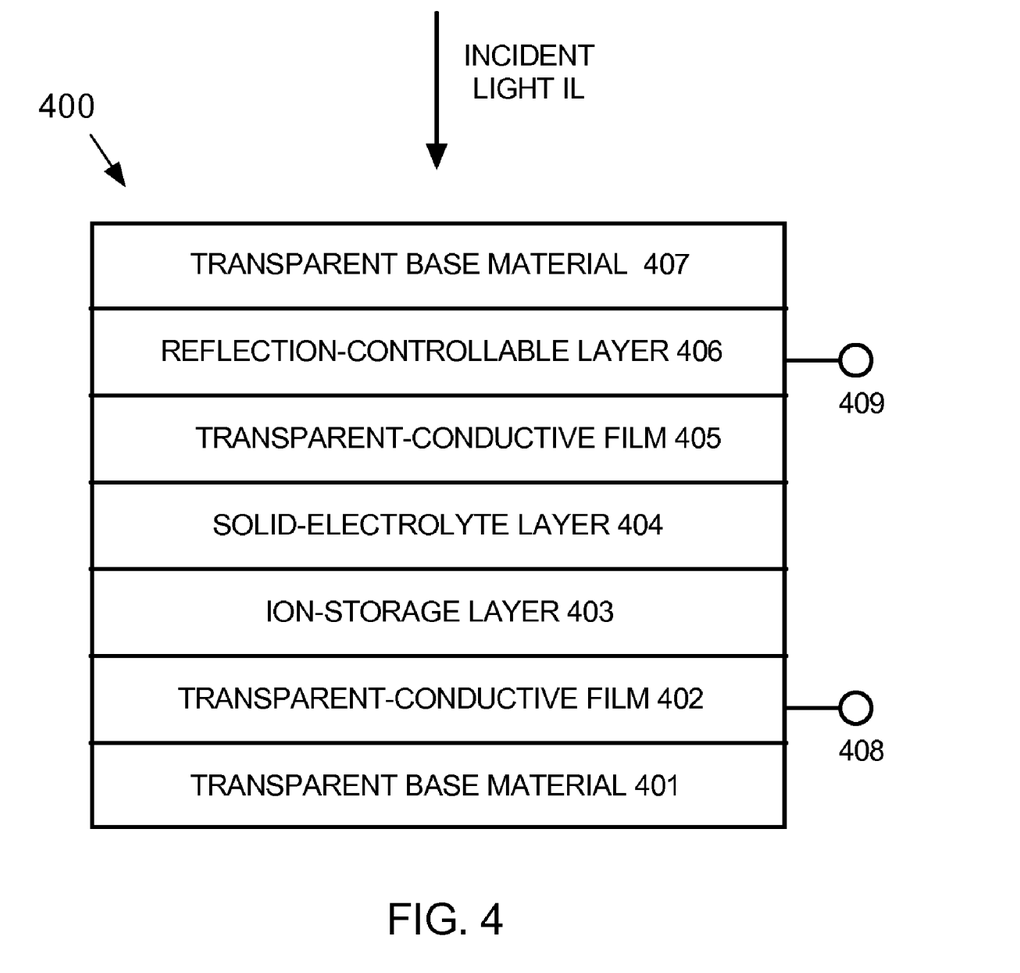
FIG. 4 depicts a cross-sectional schematic view of still another exemplary embodiment of a multilayer-stack structure of an electrochromic device according to the subject matter disclosed herein FIG. 5 graphically depicts the UV-Vis-NIR transmittance and reflectance spectra for an exemplary all-solid-state reflection-controllable electrochromic device according to the subject matter disclosed herein.

FIG. 4 depicts a cross-sectional schematic view of still another exemplary embodiment of a multilayer-stack structure 400 of an electrochromic device according to the subject matter disclosed herein. The exemplary embodiment of multilayer-stack structure 400 is similar to the exemplary embodiment of multilayer-stack structure 100, but further comprises a transparent base layer that is formed on the active reflection-controllable layer. In particular, multilayer-stack structure 400 comprises a transparent base material 401, a transparent-conductive film 402, an ion-storage layer 403, a solid-electrolyte layer 404, a transparent-conductive film 405, a reflection-controllable layer 406, and a transparent base layer 407. It should be understood that FIG. 4 is merely a depiction and does not accurately convey the relative and/or absolute sizes and thickness of the depicted layers. Additionally, electrical connections to the electrochromic device are made in a well-known manner to transparent-conductive film 302 and reflection-controllable layer 306, as respectively depicted by electrical connections 408 and 409. In an alternative embodiment, layer 406 could be formed from absorptive-based (absorption-controllable) electrochromic materials. In such an embodiment, the multilayer-stack structure would operate as an absorption-controllable electrochromic multilayer-stack structure.

An exemplary process is now described for producing the exemplary embodiment of a multilayer-stack structure shown in FIG. 1. It should be understood that the technique used for producing the exemplary multilayer-stack structure of FIG. 1 (and for producing the exemplary embodiments of FIGS. 2-4) is not limited to the following description.

In the exemplary process, a glass plate was used as a transparent base material 101. A transparent-conductive film 102 formed from fluorine-doped tin oxide (FTO) was coated on the glass plate in a well-known manner. The fluorine-doped tin oxide had a sheet resistance of 20 Ohm/□ and a thickness of 3 mm was used for the glass substrate. After rinsing, the FTO-coated glass plate was placed in a vacuum system and degassed in a well-known manner.

An ion-storage layer 103 formed by a tungsten oxide thin film was deposited in a well-known manner on the fluorine-doped tin oxide using a magnetron sputtering system. Deposition was carried out in a well-known manner using reactive DC sputtering in which a metal tungsten target was sputtered in a mixed atmosphere of argon, oxygen. The mixed atmosphere was controlled by adjusting the flow rates of argon and oxygen. The ratio of the flow rates of argon and oxygen was 3:1, and sputtering was carried out by DC sputtering at a pressure of 1 Pa inside the vacuum chamber by applying about 60 W of power to the tungsten. The thickness of the resulting tungsten oxide thin film was about 400 nm.

A solid-electrolyte layer 104 formed from a silicon-aluminum oxide thin film was produced in a well-known manner on the tungsten oxide thin film (ion-storage layer 103) by reactive sputtering in the same manner as the tungsten oxide thin film. Deposition was carried out in a well-known manner by sputtering in a mixed atmosphere of argon and oxygen to produce a thin film. The mixed atmosphere was controlled by controlling the flow rates of the argon gas and oxygen gas. The ratio of the flow rates of the oxygen gas and argon gas was about 1:10, and sputtering was carried out inside the vacuum chamber by applying about 65 W of power to the target. The thickness of the resulting silicon-aluminum oxide thin film was about 400 nm.

A cobalt layer (about 5 nm thick) and an antimony-lithium alloy thin film (about 40 nm thick) were subsequently deposited in a well-known manner using a magnetron sputtering system as a transparent-conductive layer 105 and a reflection-controllable layer 106, respectively. The composition of the antimony-lithium alloy film was approximately $SbLi_{0.2}$. The as-deposited device was in a mirrored state.

Figure 5:
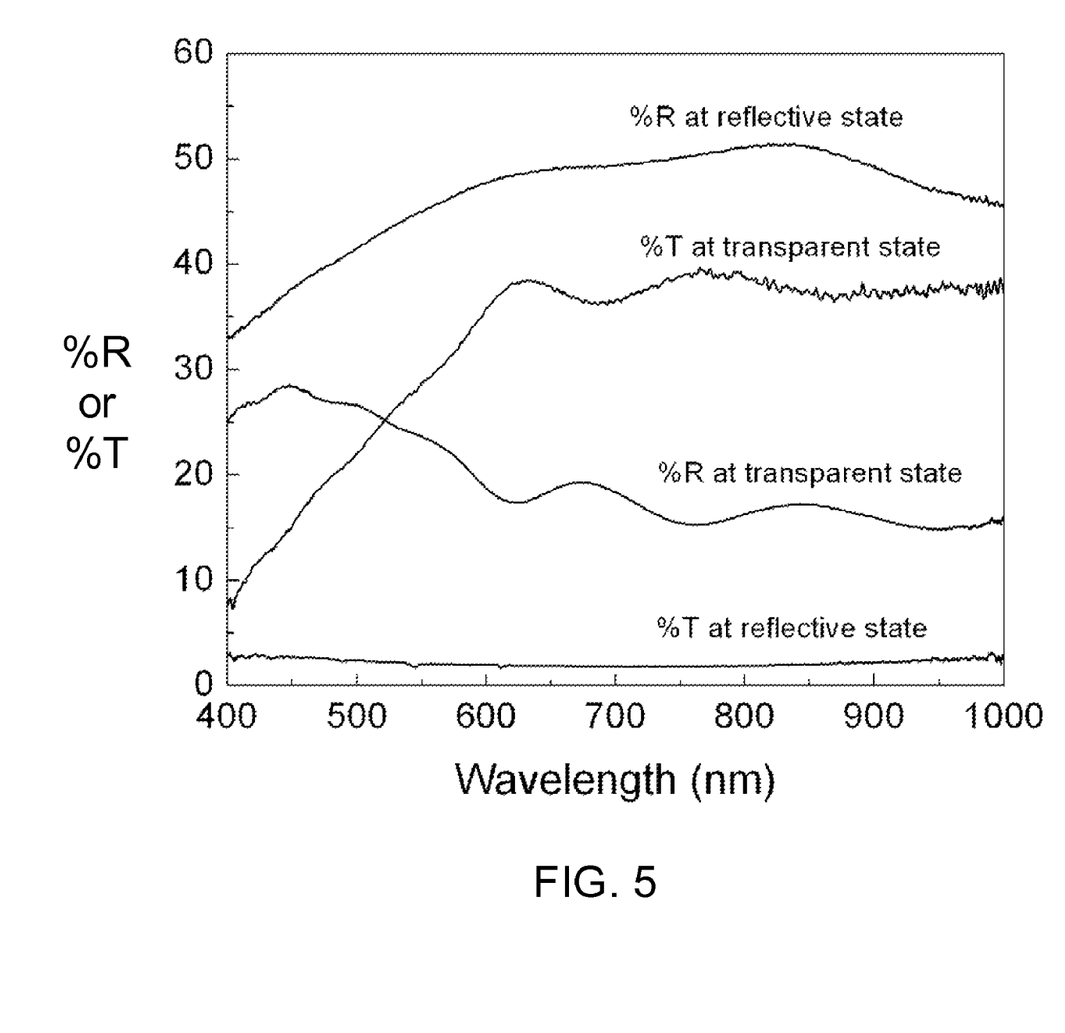
Figure 6:
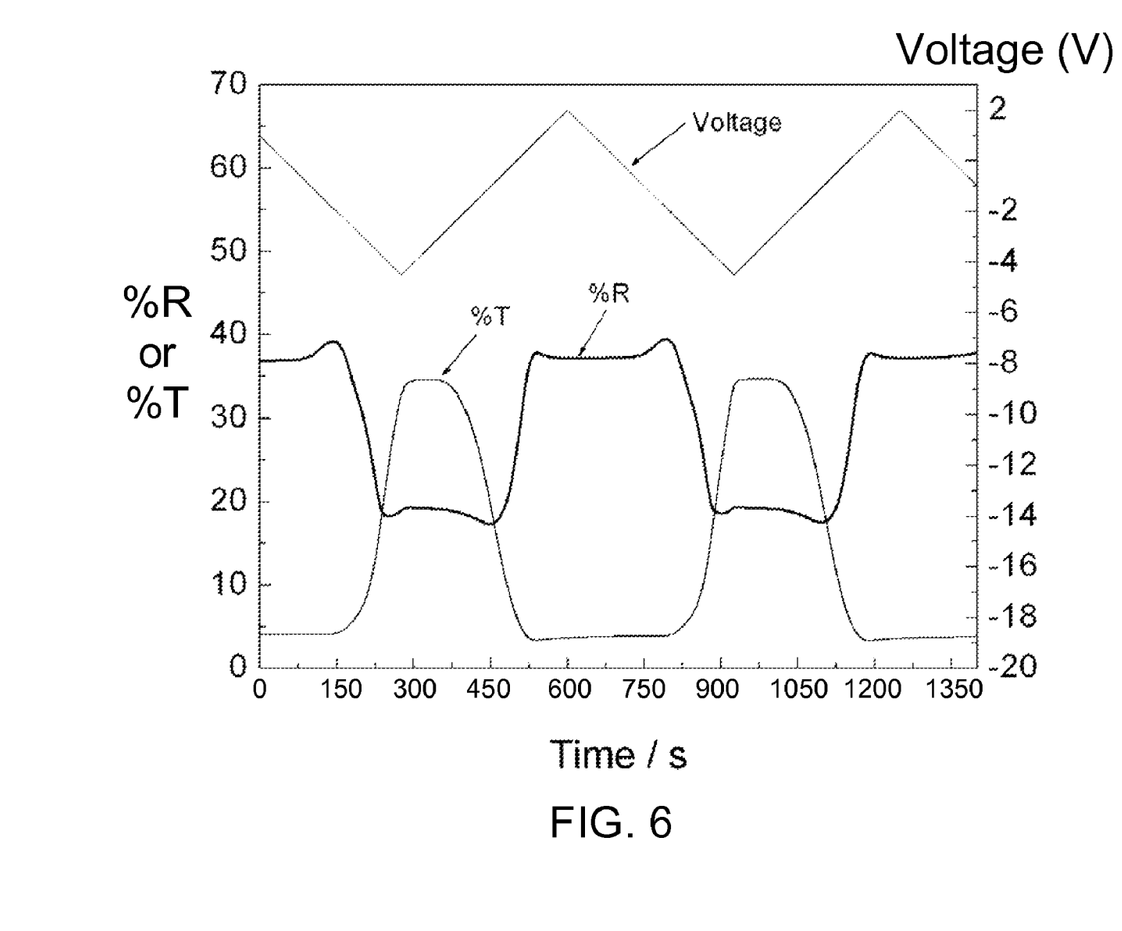
FIG. 6 graphically depicts the dynamic switching characteristics of an exemplary all-solid-state reflection-controllable electrochromic device according to the subject matter disclosed herein.

The switching characteristics of the resulting device are shown in FIGS. 5 and 6. When a voltage of −4.5 V was applied to the reflection-controllable layer (with respect to the ion-storage layer), the lithium ions in the tungsten-oxide thin film were released due to electric field effects, transferred through the solid-electrolyte layer, and then introduced into the reflection-controllable layer. As a result, the tungsten-oxide thin film forming the ion-storage layer becomes transparent, and lithiation occurs in the antimony-lithium alloy thin film forming the reflective-controllable layer, thereby causing the reflective-controllable layer to become transparent as well. This change took place in about 90 seconds, indicating a relatively fast response. Conversely, when a voltage of +2 V was applied to the reflection-controllable layer (with respect to the ion-storage layer), transmittance decreased in about 30 seconds and the reflection-controllable layer returned to a mirror state.

FIG. 5 graphically depicts the UV-Vis-NIR transmittance and reflectance spectra for an exemplary all-solid-state reflection-controllable electrochromic device according to the subject matter disclosed herein. The percentage transmittance (% T) and percentage reflective (% R) specta for electrochromic device was measured using an Ocean Optics spectrophotometer. The electrochromic device was polarized at +2 V and at −4.5 V, with the "+" terminal of the power source being connected to the reflection-controllable layer. The electrochromic device was polarized for 300 seconds before measuring the respective spectra. The switching ranges at a wavelength of about 550 nm are: transmittance (% T) between about 1.8% and about 24%; and reflectance (% R) between about 20% and about 41%.

FIG. 6 graphically depicts the dynamic switching characteristics of an exemplary all-solid-state reflection-controllable electrochromic device according to the subject matter disclosed herein. The percentage transmittance (% T) and percentage reflectance (% R) of the electrochromic device were simultaneously measured versus time using a Si photo-detector while the voltage that was applied to the device was swept between +2 V and −4.5 V at 20 mV/s. The "+" terminal of the power source was connected to the reflection-controllable layer. The Si photo-detector was sensitive to photons in the wavelength range of from about 400 nm to about 1100 nm. At a wavelength of about 550 nm, the transmittance (% T) reversibly switches between about 4% and about 34%, while the reflectance (% R) between about 17% and about 39%. Thus, the exemplary device produced can be reversibly switched between a mirror state and a transparent state by changing the polarity of the applied voltage.

Another exemplary process that could be used for forming an electrochromic device according to the subject matter disclosed herein could comprise forming a transparent-conductive film and a reflection-controllable layer on a first base material, followed by forming a transparent-conductive film, an ion-storage layer and a solid-electrolyte layer on a second base material, and then laminating the two structures together.

It should be noted that noble metals and/or alloys of noble metals could be used in place of the base metals and/or alloys of base metals described herein. It should be understood, though, noble metals and alloys of noble metals exhibit electromigration, which will adversely affect long-term performance of an electrochromic multilayer-stack structure and/or an electrochromic device comprising an electrochromic multilayer-stack structure according to the subject matter disclosed herein. However, if the solid electrolyte layer is made sufficiently thick ($\geq$ about 1 μm) and dense ($\geq$ about 90% of its crystalline density), the electromigration of noble metals in a solid-state electrochromic device can be inhibited, and therefore the use of noble metals in a solid-state device is still allowed.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. An all-solid-state electrochromic device comprising:
   a transparent base material; and
   an electrochromic multilayer-stack structure formed on the transparent base material, the electrochromic multilayer-stack structure comprising:
      a first transparent-conductive film;
      an ion-storage layer formed on the first transparent-conductive film;
      a solid-electrolyte layer formed on the ion-storage layer; and
      an electrochromic layer formed on the solid-electrolyte layer, the electrochromic layer comprising a reflection-controllable electrochromic layer comprising an antimony-based alloy comprising $Sb_xCoLi_y$, in which $0.5 \leq x \leq 10$, and $0.1 \leq y \leq 10$.

2. The all-solid-state electrochromic device according to claim 1, wherein $3 \leq x \leq 5$ and $0.1 \leq y \leq 3$.

3. The all-solid-state electrochromic device according to claim 1, further comprising a second transparent-conductive film formed between the solid-electrolyte layer and the reflection-controllable layer.

4. The all-solid-state electrochromic device according to claim 3, wherein the second transparent-conductive film comprises a surface resistance of less than or equal to about 100 Ohm/□.

5. The all-solid-state electrochromic device according to claim 3, wherein the second transparent-conductive film comprises at least one of Co, Mn, Ni, Fe, Zn, Ti, V, Cr, Zr, Nb, Mo, Hf, Ta, W, Cd, Mg, Al, Ga, In, Sn, Pb, Bi, or alloys thereof.

6. The all-solid-state electrochromic device according to claim 5, wherein the second transparent-conductive film comprises a thickness of between about 0.1 nm and about 400 nm.

7. The all-solid-state electrochromic device according to claim 6, wherein the second transparent-conductive film comprises a thickness of about 0.5 nm to about 50 nm.

8. An all-solid-state electrochromic device comprising:
   a transparent base material; and
   an electrochromic multilayer-stack structure formed on the transparent base material, the electrochromic multilayer-stack structure comprising:
      a first transparent-conductive film;
      an ion-storage layer formed on the first transparent-conductive film;
      a solid-electrolyte layer formed on the ion-storage layer; and
      an electrochromic layer formed on the solid-electrolyte layer, the electrochromic layer comprising a reflection-controllable electrochromic layer comprising an antimony-based alloy comprising $Sb_xMnLi_y$, in which $0.5 \leq x \leq 10$, and $0.1 \leq y \leq 10$.

9. The all-solid-state electrochromic device according to claim 8, wherein $3 \leq x \leq 5$ and $0.1 \leq y \leq 3$.

10. The all-solid-state electrochromic device according to claim 8, further comprising a second transparent-conductive film formed between the solid-electrolyte layer and the reflection-controllable layer.

11. The all-solid-state electrochromic device according to claim 10, wherein the second transparent-conductive film comprises a surface resistance of less than or equal to about 100 Ohm/□.

12. The all-solid-state electrochromic device according to claim 10, wherein the second transparent-conductive film comprises at least one of Co, Mn, Ni, Fe, Zn, Ti, V, Cr, Zr, Nb, Mo, Hf, Ta, W, Cd, Mg, Al, Ga, In, Sn, Pb, Bi, or alloys thereof.

13. The all-solid-state electrochromic device according to claim 12, wherein the second transparent-conductive film comprises a thickness of between about 0.1 nm and about 400 nm.

14. The all-solid-state electrochromic device according to claim 13, wherein the second transparent-conductive film comprises a thickness of about 0.5 nm to about 50 nm.

* * * * *